United States Patent
MacDonald

(10) Patent No.: US 10,465,554 B2
(45) Date of Patent: Nov. 5, 2019

(54) TURBINE ENGINE SHAFT BREAK DETECTION

(71) Applicant: ROLLS-ROYCE plc, London (GB)

(72) Inventor: Alexander MacDonald, Derby (GB)

(73) Assignee: ROLLS-ROYCE PLC, London (GB)

( * ) Notice: Subject to any disclaimer, the term of this patent is extended or adjusted under 35 U.S.C. 154(b) by 311 days.

(21) Appl. No.: 14/944,619

(22) Filed: Nov. 18, 2015

(65) Prior Publication Data

US 2016/0194977 A1     Jul. 7, 2016

(30) Foreign Application Priority Data

Jan. 5, 2015    (GB) .................................. 1500065.6

(51) Int. Cl.

| | | |
|---|---|---|
| *F01D 21/04* | (2006.01) | |
| *F01D 21/02* | (2006.01) | |
| *F01D 5/02* | (2006.01) | |
| *F01D 21/00* | (2006.01) | |
| *F02C 9/46* | (2006.01) | |
| *G01M 15/14* | (2006.01) | |

(52) U.S. Cl.
CPC ............. *F01D 21/04* (2013.01); *F01D 5/02* (2013.01); *F01D 21/003* (2013.01); *F01D 21/02* (2013.01); *F01D 21/045* (2013.01); *F02C 9/46* (2013.01); *G01M 15/14* (2013.01); *F05D 2220/30* (2013.01); *F05D 2240/60* (2013.01); *F05D 2260/80* (2013.01); *F05D 2260/83* (2013.01)

(58) Field of Classification Search
CPC ........ F01D 21/003; F01D 21/02; F01D 21/04; F01D 21/045; F01D 5/02; F05D 2220/30; F05D 2240/60; F05D 2260/80; F05D 2260/83; G01M 15/14
USPC ........................................................... 702/43
See application file for complete search history.

(56) References Cited

U.S. PATENT DOCUMENTS

| | | | |
|---|---|---|---|
| 4,454,754 A | 6/1984 | Zagranski et al. | |
| 5,234,315 A | 8/1993 | Ogihara et al. | |
| 5,293,774 A | 3/1994 | Ratherham | |
| 6,494,046 B1 * | 12/2002 | Hayess ................... | F01D 21/00 60/39.091 |

(Continued)

FOREIGN PATENT DOCUMENTS

| | | |
|---|---|---|
| DE | 102009016106 A1 | 8/2010 |
| EP | 2599969 A2 | 6/2013 |

(Continued)

*Primary Examiner* — Duy T Nguyen
(74) *Attorney, Agent, or Firm* — Oliff PLC

(57) ABSTRACT

A method of detecting a shaft break in a turbine engine is provided. The shaft connects a torque-exerting turbine of the engine to a torque-receiving unit of the engine. The method includes: receiving repeated measurements of the rotational frequency of the torque-receiving unit and the rotational frequency measurements of the turbine; determining from the measurements an amount of shaft twist between the turbine and the torque-receiving unit; comparing the amount of twist with a threshold twist value; and signalling a shaft break when the amount of twist exceeds the threshold twist value and a pre-condition is met. The pre-condition includes determining from the measurements that the turbine rotational speed is greater than the simultaneous torque-receiving unit rotational speed by a threshold speed value.

22 Claims, 9 Drawing Sheets

(56) References Cited

U.S. PATENT DOCUMENTS

2013/0319092 A1* 12/2013 Rowe .................. F01D 21/003
73/112.01

FOREIGN PATENT DOCUMENTS

| EP | 2604993 | A2 | 6/2013 |
|----|---------|----|--------|
| GB | 2111639 | *  | 7/1983 |
| GB | 2123568 | A  | 2/1984 |
| GB | 2488805 | A  | 9/2012 |

* cited by examiner

TURBINE ENGINE SHAFT BREAK DETECTION

FIELD OF THE INVENTION

The present invention relates to a method and a system for detecting a shaft break in a turbine engine.

BACKGROUND OF THE INVENTION

The strength and weight of an aero gas turbine engine low pressure turbine (LPT) system is governed by the maximum turbine speed (terminal speed) that can occur after failure of the low pressure (LP) shaft connecting the LPT and the LP torque-receiving unit (typically an LP compressor or a fan). Functionality can be built into the engine control system to detect shaft breakage and take accommodation actions (e.g. shut-off fuel flow to the engine) to reduce the turbine terminal speed.

For example, rotational frequency sensors can be provided at each end of the shaft, e.g. as described in U.S. Pat. No. 6,494,046. There may be eight such sensors in total, with four measuring compressor speed and four measuring turbine speed for a dual-channel redundant control system. The processed signals can determine a measure of twist within the shaft. When the twist exceeds a threshold (for example 25°), accommodation actions are triggered.

FIG. 1 shows plots for the same engine spool of: modelled physical (actual) shaft twist against time, and shaft twist against time as determined by a turbine overspeed (TOS) shaft break detection system which conservatively overestimates the amount of twist. To deliver an 18 ms detection time (corresponding to 25° on the TOS twist plot), the TOS detection system needs to trip when the actual twist in the shaft is only around 7°. The plateau at 30° on the TOS twist plot is simply the upper limit of the detection system.

TOS detection systems may be susceptible to "false positive" spurious detections following engine events such as surge and ice ingestion. For example, FIG. 2 shows a plot of shaft twist against time according to a TOS detection system interpretation of the signals from four sets of frequency sensors, the plot encompassing an ice shedding manoeuvre starting at about time –0.25 s. The detected twist peaks at about 11°, which is a substantial proportion of the 25° threshold. FIG. 3 shows plots, for the same engine spool and the same ice shedding manoeuvre, of: demanded LP shaft speed (NL Dem), actual LPT speed (NLT), actual LP compressor speed (NLC), the speed in each case being expressed as a percentage of maximum shaft speed. The ice shedding manoeuvre causes the spool to resonate, thereby superimposing oscillatory patterns on NLT and NLC as the shaft speed increases from a lower level to the higher demanded level. FIG. 4 shows plots, for a simplified synthesis of the same engine spool and the same ice shedding manoeuvre, of: modelled physical (actual) shaft twist against time, and shaft twist against time as determined by the TOS detection system. The actual shaft twist during the event is probably less than 2°.

A turbine engine spool can be simulated as two masses coupled by a relatively flexible shaft. When an excitation is applied to the shaft the shaft speed varies approximately sinusoidally at a resonant frequency. The resonant frequency can be determined by simple mechanics from the inertias of the two masses and the shaft stiffness. For a typical large 3-shaft engine, the resonant frequency of the LP shaft may be around 14 Hz. Events such as that illustrated in FIGS. 2 and 3 allow the resonant frequency to be checked. The position of the fan and/or the turbine at a given time can be determined from such a simulation for any resonance amplitude and frequency.

Thus known spurious trip threats cause first order torsional resonance of the LP system. For half of the resonance period these events have a signature that is difficult to distinguish from that of a breakage event. Due to the requirement for rapid shaft break detection, a resonance of relatively modest amplitude can cause spurious detection of breakage. To eliminate the risk of spurious detection using known approaches would require a confirmation period greater than half of the resonance period.

Accordingly, there is a need to provide fast and reliable detection of shaft breakage via a detection system that does not respond to spurious trip threats. One approach for reducing the likelihood of spurious detections would be to allow a longer period of time in which to detect shaft breaks. However, this would lead to an undesirable increase in engine weight.

SUMMARY OF THE INVENTION

In the following, as is conventional for turbine engines, rotational speeds are expressed either in terms of a percentage of a maximum normal rotational speed rating for the respective shaft, or in angular degrees per second. Consistent with these, rotational accelerations may be expressed with units of $\%s^{-1}$ or with units of $deg.s^{-2}$.

In a first aspect, the present invention provides a method of detecting a shaft break in a turbine engine, the shaft connecting a torque-exerting turbine of the engine to a torque-receiving unit of the engine, the method including:

receiving repeated measurements of the rotational frequency of the torque-receiving unit and the rotational frequency measurements of the turbine;

determining from the measurements an amount of shaft twist between the turbine and the torque-receiving unit;

comparing the amount of twist with a threshold twist value; and signalling a shaft break when the amount of twist exceeds the threshold twist value and a pre-condition is met;

wherein the pre-condition includes determining from the measurements that the turbine rotational speed is greater than the simultaneous torque-receiving unit rotational speed by a threshold speed value.

Advantageously, by implementing the pre-condition, instances of spurious shaft break detection can be prevented. In particular, the pre-condition is based on the recognition that on shaft break, and in contrast to some instances of shaft resonance, the turbine rotational speed becomes significantly greater than that of the torque-receiving unit. The pre-condition may be most effective at the onset of resonance, because at this time the speed difference between the turbine and the torque-receiving unit is generally a long way from the high values that are characteristic of a shaft failure.

For example, the threshold speed value may be at least 0.1%, 0.5%, 1% or 2% greater than the simultaneous torque-receiving unit rotational speed determined from the measurements.

The pre-condition may further include determining from the measurements that the turbine acceleration is increasing simultaneously while the torque-receiving unit acceleration is decreasing. More particularly, upon shaft failure there are generally distinct, near simultaneous, discontinuities in both torque-receiving unit and turbine acceleration signals, with the turbine acceleration increasing and the torque-receiving unit acceleration decreasing. In contrast, for resonance discontinuities are typically not simultaneous and are both in the same sense.

The method may further include:
determining from the measurements the acceleration of the turbine;
detecting periods when the turbine acceleration falls below a threshold acceleration value; and
inhibiting, for a predetermined duration following the end of such a period, the determination of an amount of shaft twist, the comparison with a threshold twist value, and the signalling of a shaft break.

The inhibition procedure is based on the recognition that shaft resonance produces cycles of decreasing and increasing turbine acceleration, while on shaft break the turbine initially simply accelerates. Thus advantageously, by implementing the inhibition procedure, further instances of spurious shaft break detection can be prevented.

Indeed, in a second aspect, the present invention provides a method of detecting a shaft break in a turbine engine, the shaft connecting a torque-exerting turbine of the engine to a torque-receiving unit of the engine, the method including:
receiving repeated measurements of the rotational frequency of the torque-receiving unit and the rotational frequency measurements of the turbine;
determining from the measurements an amount of shaft twist between the turbine and the torque-receiving unit;
comparing the amount of twist with a threshold twist value;
determining from the measurements the acceleration of the turbine;
detecting periods when the turbine acceleration falls below a threshold acceleration value; and
signalling a shaft break when the amount of twist exceeds the threshold twist value, except that the determination of an amount of shaft twist, the comparison with a threshold twist value, and the signalling of a shaft break is inhibited for a predetermined duration following the end of such a period.

The threshold acceleration value can be set as a function of engine speed or power.

For example, the threshold acceleration value may be a constant value of e.g. $-5\%\ s^{-1}$, $-10\%\ s^{-1}$, $-20\%\ s^{-1}$ or $-30\%\ s^{-1}$.

However, another possibility, which takes into account any underlying engine acceleration or deceleration, is for the threshold acceleration value to be equal to the simultaneous acceleration of the torque-receiving unit as determined from the measurements optionally minus an acceleration offset value. For example, the acceleration offset value can be zero, or if non-zero it can be $1\%\ s^{-1}$, $-2\%\ s^{-1}$, $5\%\ s^{-1}$ or $10\%\ s^{-1}$.

For around a half of a resonance cycle (ignoring any underlying engine acceleration or deceleration) the turbine is decelerating. Thus to protect the portion of the resonance cycle where the turbine is accelerating, the predetermined duration may be about half of the first order torsional resonance period of the engine spool formed by the torque-receiving unit, shaft and turbine. In this way the timed inhibit can be enforced only on the determination of shaft twist when deceleration of the turbine is detected.

Further optional features of the invention will now be set out. These are applicable singly or in any combination with any aspect of the invention.

In the method of the first or second aspect, the torque-receiving unit can be a fan or a compressor. Moreover, the turbine engine can be a gas turbine engine. For example, it can be an aero engine, with the shaft connecting a fan or low pressure compressor to a low pressure turbine. The method of the first or second aspect may further include performing the repeated measurements of the rotational frequency of the torque-receiving unit and the rotational frequency of the turbine.

In a third aspect, the present invention provides a system for detecting a shaft break in a turbine engine, the shaft connecting a torque-exerting turbine of the engine to a torque-receiving unit of the engine, the system having a processor unit for performing the method of the first or second aspect.

For example, the processor unit can be part of an engine electronic controller.

The system may further have sensors for performing the repeated measurements of the rotational frequency of the torque-receiving unit and the rotational frequency of the turbine.

In a fourth aspect, the present invention provides a turbine engine fitted with the system of the third aspect.

In a fifth aspect, the present invention provides a computer program comprising code which, when run on a computer, causes the computer to perform the method of the first or second aspect.

In a sixth aspect, the present invention provides a computer readable medium storing a computer program comprising code which, when run on a computer, causes the computer to perform the method of the first or second aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Specific details are given in the following description to provide a thorough understanding of the embodiments.

However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "computer readable medium" may represent one or more devices for storing data, including read only memory (ROM), random access memory (RAM), magnetic RAM, core memory, magnetic disk storage media, optical storage media, flash memory devices and/or other machine readable media for storing information. The term "computer-readable medium" includes, but is not limited to portable or fixed storage devices, optical storage devices, wireless channels and various other media capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 5:
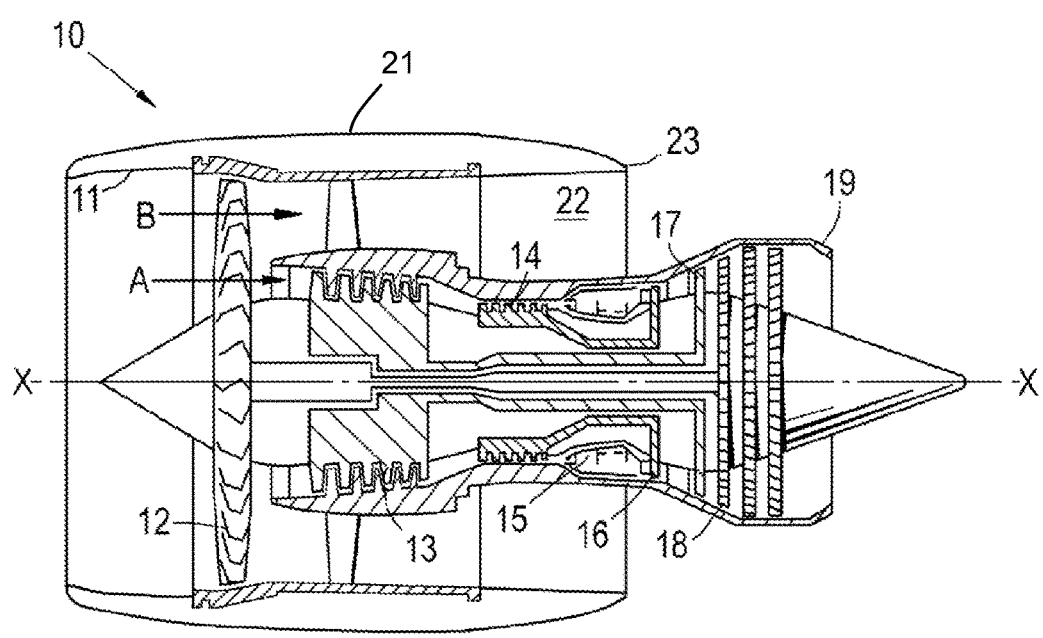
FIG. 5 shows a longitudinal cross-section through a ducted fan gas turbine engine.

With reference to FIG. 5, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive the high, intermediate and low pressure turbines 16, 17, 18 before being exhausted through the nozzle 19 to provide additional propulsive thrust. The high, intermediate and low pressure turbines respectively drive the high and intermediate pressure compressors 14, 13 and the fan 12 by suitable interconnecting shafts.

The engine has rotational frequency sensors for measuring the fan speed and the low pressure turbine speed. For example, there may be four fan speed sensors and four turbine speed sensors for a dual-channel redundant control system. A computer system in the form of an engine electronic controller has a processor unit which receives the sensor measurements and implements a shaft break detection system described below.

The detection system uses the measurements to determine a measure of twist within the shaft connecting the fan 12 and the low pressure turbine 18. When the twist exceeds a threshold, accommodation actions are triggered, such as shutting off fuel supply to the engine.

Figure 6:
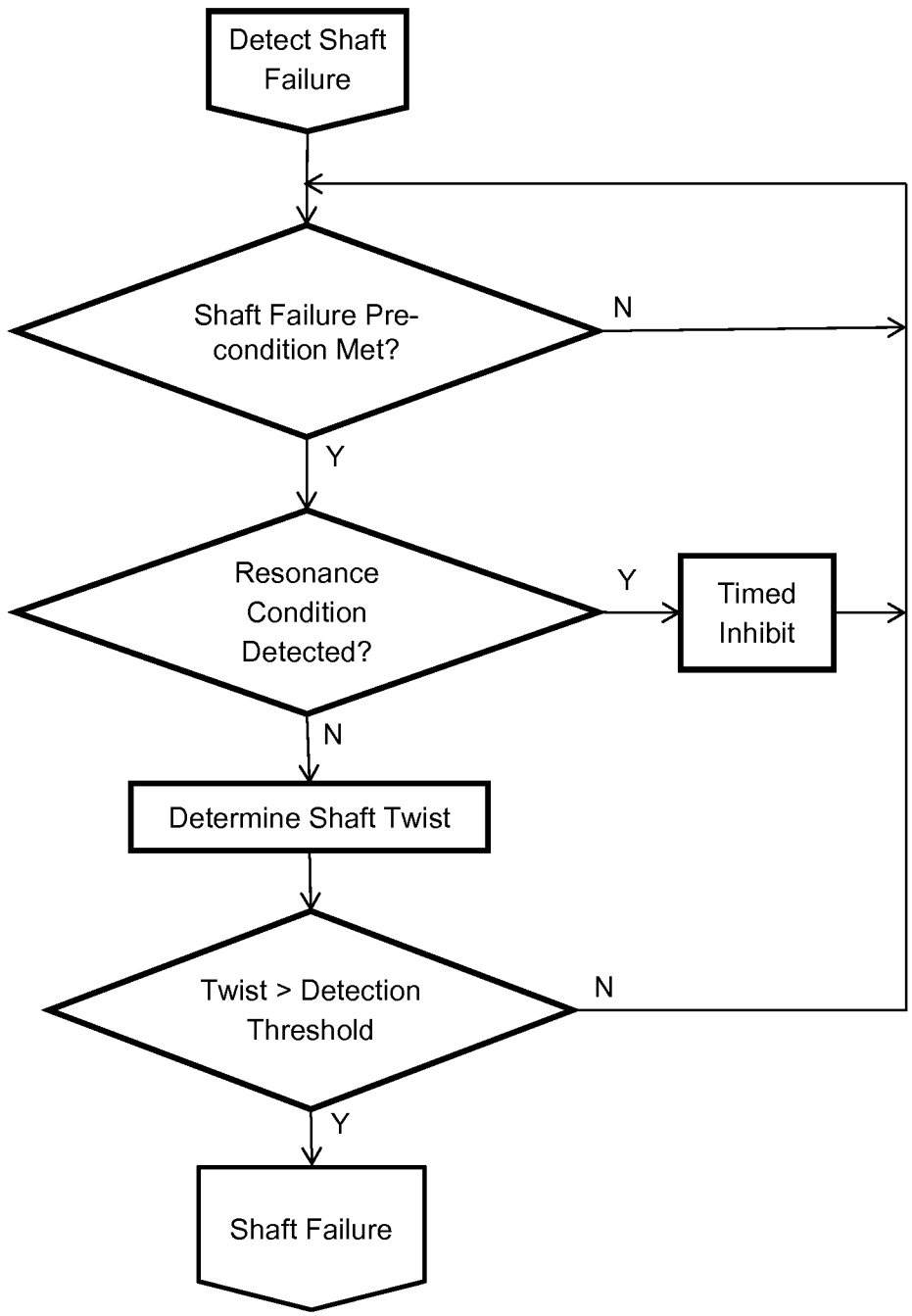
FIG. 6 shows an overview of the processing within a shaft break detection system.

However, the system also implements one or more strategies to prevent spurious detection. FIG. 6 shows an overview of the processing within the system. A first strategy is to set a pre-condition that must be met before the underlying detection algorithm can register a shaft failure. A second strategy is to inhibit signalling of a shaft break for a predetermined duration after the onset of a resonance condition. Preferably both strategies are adopted.

In more detail, the pre-condition strategy is that, based on the speed measurements, the turbine speed must be higher than the simultaneous fan speed by a threshold speed value, which can be e.g. 1%, 1.5% or 2% of the fan speed.

For a typical shaft failure the pre-condition will take only about 3 ms to be met. This strategy alone improves robustness throughout periods of resonance, but it is most effective at the onset of resonance, because at this time the speed difference between the turbine and the torque-receiving unit is generally a long way from the high values that are characteristic of a shaft failure.

Figure 7:
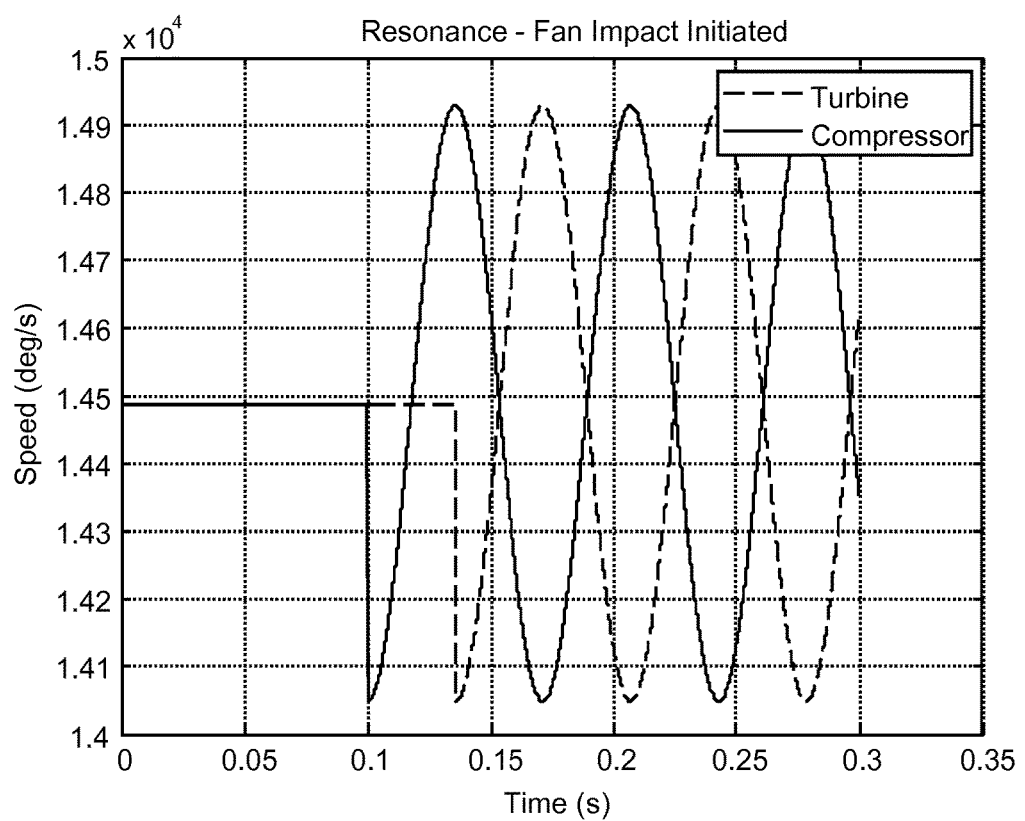
FIG. 7 shows modelled fan and turbine speeds for a resonance induced by an impact on the fan.
Figure 8:
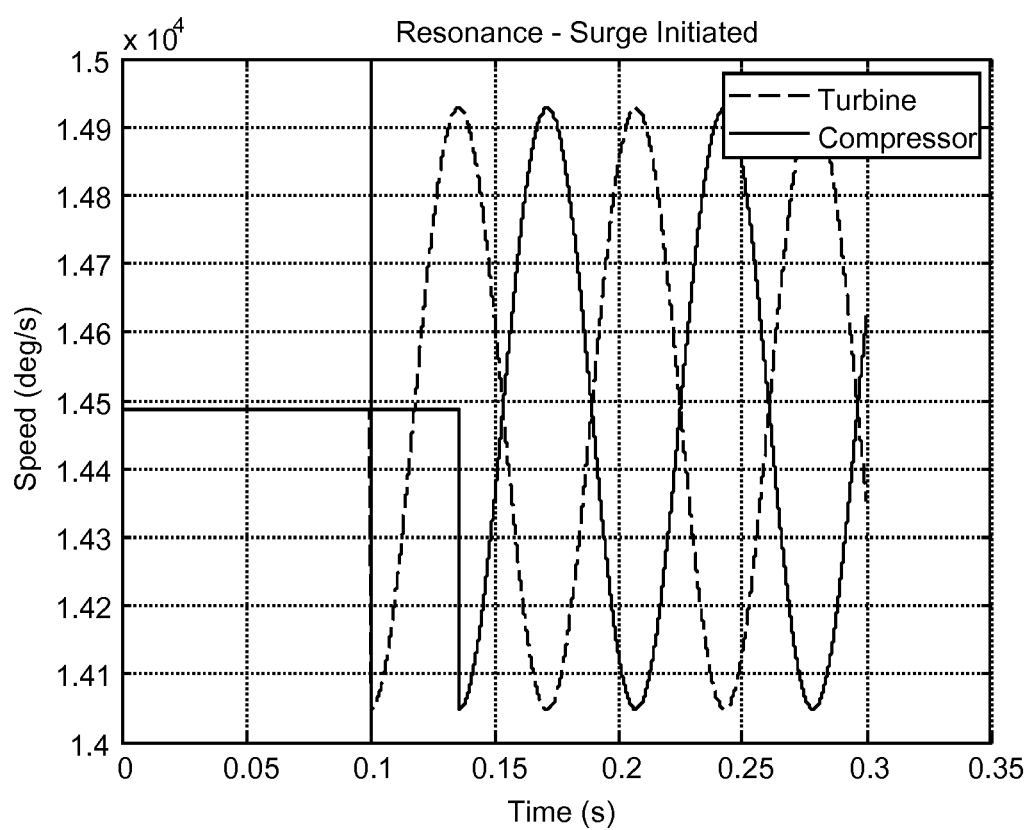
FIG. 8 shows modelled compressor and turbine speeds for a resonance induced by surge.

For resonances that are initiated by fan impact, particularly if the impact is extreme, the basic pre-condition may be unable to prevent spurious detection. Although protection can be enhanced by increasing the threshold speed value, this increases the minimum detection time. A developed version of the pre-condition thus differentiates between potential shaft failure and potential resonance at the onset of an event. More particularly, upon shaft failure there are distinct, near simultaneous, discontinuities in both fan and turbine acceleration signals, with the turbine acceleration increasing and the fan acceleration decreasing. For resonance, on the other hand, discontinuities are not simultaneous and are both in the same sense (generally decelerating). FIG. 7 shows, for example, modelled fan and turbine speeds for a resonance induced by an impact on the fan (without damping), and FIG. 8 shows modelled compressor and turbine speeds for a resonance induced by surge (without damping).

Independently differentiating the fan and turbine accelerations allows these discontinuities to be detected. Accordingly, the developed version of the pre-condition requires that, as well as the turbine speed being higher than the fan speed by a threshold speed value, a simultaneous pattern of increasing turbine acceleration and decreasing compressor acceleration must be detected.

Turning to the inhibition strategy, this involves: determining from the measurements the acceleration of the turbine, and detecting periods when the turbine acceleration falls below a threshold acceleration value. The underlying detection algorithm which determines the amount of shaft twist, compares the amount of twist with a threshold twist value, and signals a shaft break is then inhibited by the system for a predetermined duration following the end of such a period. The threshold acceleration value can be set as a function of engine speed or power.

Figure 1:
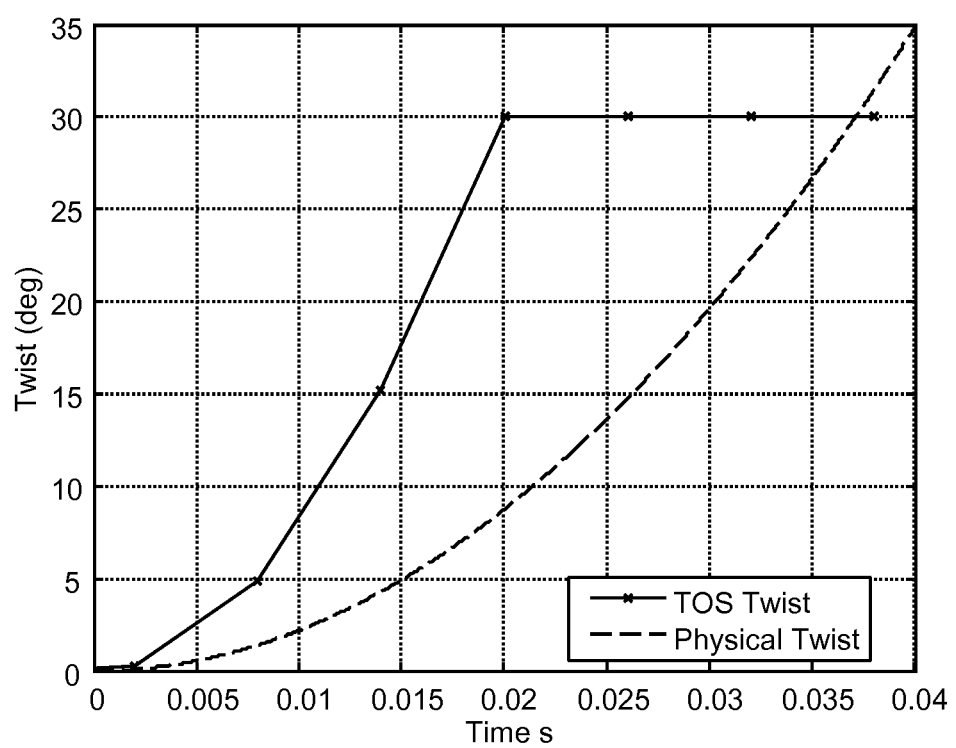
FIG. 1 shows plots for the same engine spool of: modelled physical (actual) shaft twist against time, and shaft twist against time as determined by a turbine overspeed (TOS) shaft break detection system which conservatively overestimates the amount of twist.
Figure 2:
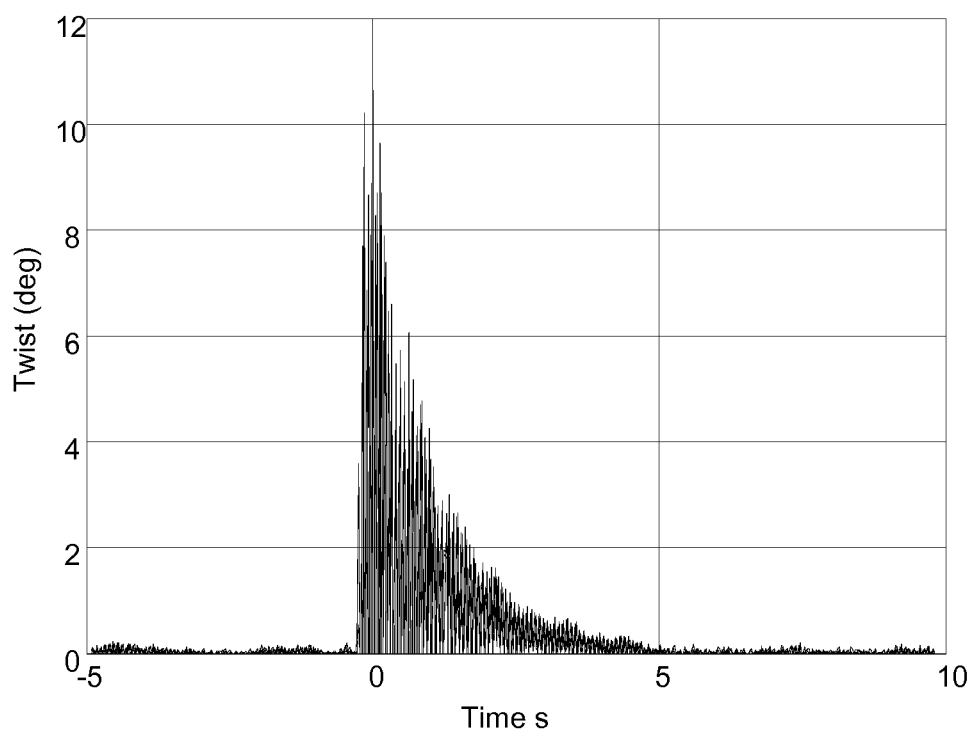
FIG. 2 shows a plot of shaft twist against time according to a TOS detection system interpretation of the signals from four sets of frequency sensors, the plot encompassing an ice shedding manoeuvre starting at about time $-0.25$ s.
Figure 3:
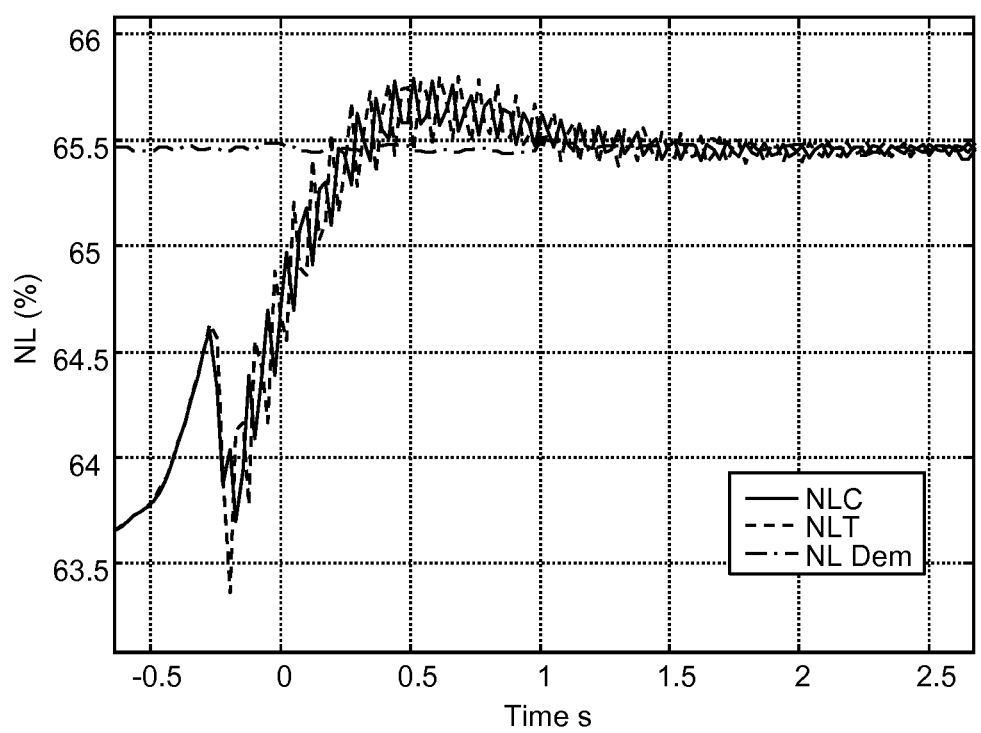
FIG. 3 shows plots, for the same engine spool and the same ice shedding manoeuvre as FIG. 2, of: demanded LP shaft speed (NL Dem), actual LPT speed (NLT), actual LP compressor speed (NLC), the speed in each case being expressed as a percentage of maximum shaft speed.
Figure 4:
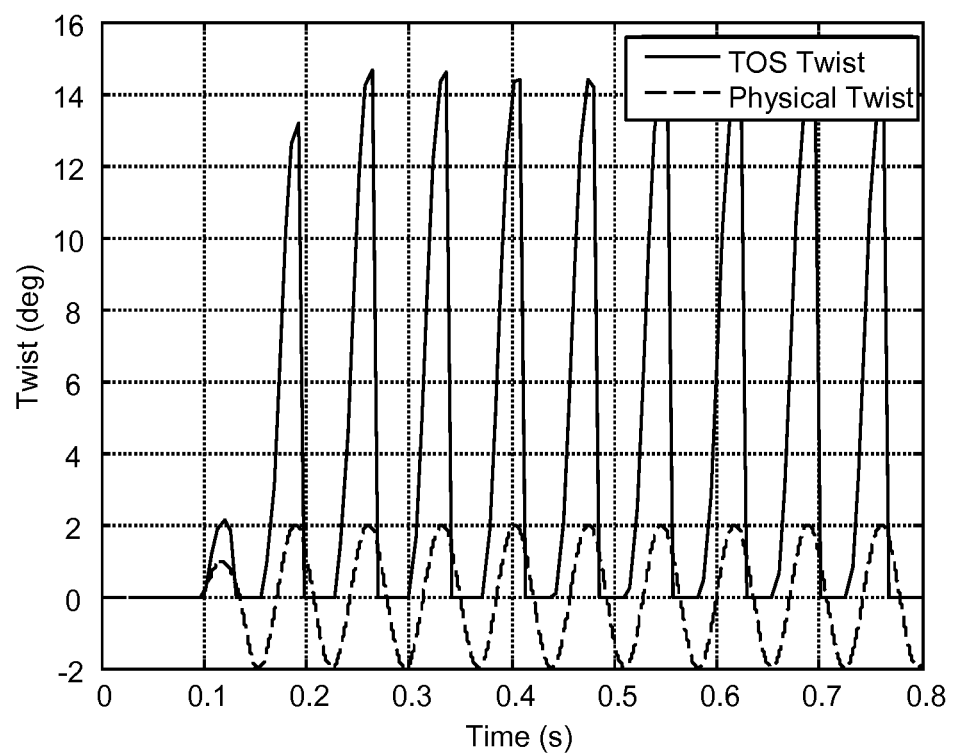
FIG. 4 shows plots, for a simplified synthesis of the same engine spool and the same ice shedding manoeuvre as FIG. 2, of: modelled physical (actual) shaft twist against time, and shaft twist against time as determined by the TOS detection system.
Figure 9:
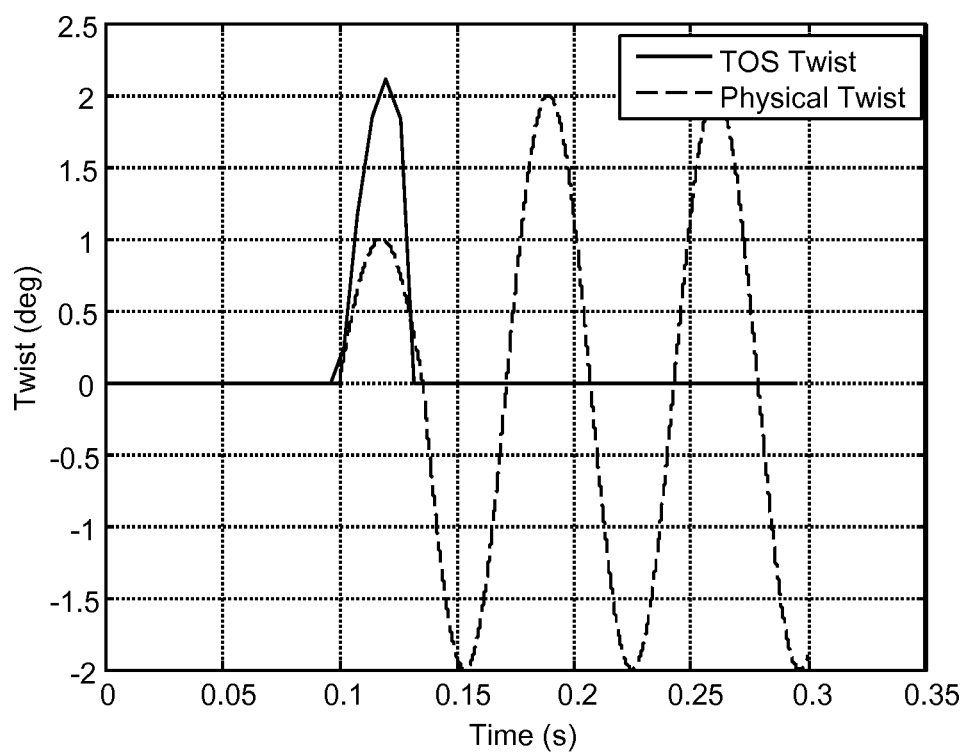
FIG. 9 shows a shaft break detection inhibition strategy applied to the data of FIG. 4.

FIG. 9 shows, for example, the inhibition strategy applied to the data of FIG. 4. In this case, when an initial rapid deceleration of the turbine is detected, determination of twist accumulation is inhibited for a duration of, for example, 50 ms, such deceleration being a characteristic of resonance that does not occur following shaft failure. In combination with the first (pre-condition) strategy, this results in the TOS shaft break detection system being inhibited from signalling a shaft break after the turbine deceleration which commences at about 0.135 s.

For around a half of the resonance cycle (ignoring any underlying engine acceleration or deceleration) the turbine is decelerating. Thus to protect the portion of the resonance cycle where the turbine is accelerating, the timed inhibit is only enforced on the determination of shaft twist when deceleration of the turbine is detected. The inhibit duration can be based upon the resonant frequency, which is a basic property of the engine's mechanical design (and is relatively invariant with respect to production variability and in-service degradation). For example, the inhibit duration can be about half of the first order torsional resonance period of the engine spool formed by the fan, shaft and turbine.

Turbine deceleration during a resonance event is the sum of the deceleration associated with the resonance and any underlying engine acceleration or deceleration. Consequently for resonance during rapid engine acceleration the magnitude of the turbine deceleration during resonance is reduced. Accordingly, the threshold acceleration value which the turbine acceleration must fall below in order to inhibit signalling of a shaft break can be made equal to the simultaneous acceleration of the fan (as determined from the fan speed measurements) minus an optional acceleration offset value. In this way, the threshold continuously compensates for underlying engine acceleration or deceleration. During resonance the difference between the relative turbine and fan accelerations periodically goes significantly negative, even during rapid underlying engine acceleration, whilst during shaft failure the difference is permanently significantly positive. The acceleration offset value, if applied, can be quite low, for example, about 1% $s^{-1}$, 2% $s^{-1}$, 5% $s^{-1}$ or 10% $s^{-1}$.

If the trigger condition for inhibition is simply deceleration of the turbine (i.e. taking no account of underlying engine acceleration), the threshold acceleration value which the turbine acceleration must fall below in order to inhibit signalling of a shaft break should preferably be set below the maximum deceleration seen during normal operation. This helps to avoid delaying detection of shaft failure if the engine was decelerating (normally) at the instance the shaft failed. For example, the threshold acceleration value can be a constant value of about $-5\%\ s^{-1}$, $-10\%\ s^{-1}$, $-20\%\ s^{-1}$ or $-30\%\ s^{-1}$. In particular, the threshold may be around $-30\%\ s^{-1}$ for a large 3-shaft gas turbine engine, the maximum normal turbine deceleration in such engines being around $-22\%\ s^{-1}$.

The inhibition strategy does not provide protection against spurious shaft break detection until the first turbine (relative) deceleration. Therefore, dependent upon how resonance is initiated, there may be a period where the pre-condition strategy alone is relied upon for protection.

The pre-condition and inhibition strategies, preferably deployed in combination, provide improved protection against known spurious trip threats, thereby allowing configuration parameters for the underlying shaft break detection to be adjusted to give a more rapid detection. In turn this can ultimately enable a saving in engine weight by permitting a lighter turbine. For example, tests on a large 3-shaft turbofan engine have shown an approximately 33% reduction in shaft break detection time for worst case conditions, allowing a significant reduction in low pressure turbine weight.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of detecting a shaft break in a turbine engine, a shaft connecting a torque-exerting turbine of the turbine engine to a torque-receiving unit of the turbine engine, the method including:
   receiving repeated measurements of the rotational frequency of the torque-receiving unit and the rotational frequency measurements of the torque-exerting turbine;
   determining from the measurements, with a processor, that a shaft break pre-condition is met, the shaft break pre-condition being that a rotation speed of the torque-exerting turbine is greater than a simultaneous rotational speed of the torque-receiving unit by a threshold speed value; and
   when the shaft break pre-condition is met,
      determining, with the processor, from the measurements an amount of shaft twist between the torque-exerting turbine and the torque-receiving unit;
      comparing, with the processor, the amount of shaft twist with a threshold twist value; and
      signalling, with the processor, the shaft break when the amount of shaft twist exceeds the threshold twist value.

2. The method according to claim 1, wherein the threshold speed value is at least 0.1% greater than the simultaneous torque-receiving unit rotational speed determined from the measurements.

3. The method according to claim 1, wherein the pre-condition further includes determining from the measurements that the torque-exerting turbine acceleration is increasing simultaneously while the torque-receiving unit acceleration is decreasing.

4. The method according to claim 1, further including:
   determining from the measurements the acceleration of the torque-exerting turbine;
   detecting periods when the torque-exerting turbine acceleration falls below a threshold acceleration value; and
   inhibiting, for a predetermined duration following the end of such a period, the determination of the amount of shaft twist, the comparison with a threshold twist value, and the signalling of the shaft break.

5. The method according to claim 4, wherein the threshold acceleration value is equal to the simultaneous acceleration of the torque-receiving unit as determined from the measurements optionally minus an acceleration offset value.

6. The method according to claim 4, wherein the predetermined duration is about half of the first order torsional resonance period of the engine spool formed by the torque-receiving unit, shaft and turbine.

7. The method according to claim 1, wherein the turbine engine is a gas turbine engine.

8. The method according to claim 1, further including performing the repeated measurements of the rotational frequency of the torque-receiving unit and the rotational frequency of the torque-exerting turbine.

9. A system for detecting the shaft break in the turbine engine, the shaft connecting the torque-exerting turbine of the engine to the torque-receiving unit of the engine, the system having the processor for performing the method of claim 1.

10. The system according to claim 9, further having sensors for performing the repeated measurements of the rotational frequency of the torque-receiving unit and the rotational frequency of the torque-exerting turbine.

11. The turbine engine fitted with the system of claim 9.

12. A non-transitory computer readable medium storing a computer program comprising instructions which, when run on a computer, causes the computer to perform the method of claim 1.

13. The method according to claim 1, further comprising taking accommodation actions, with the processor, to reduce the turbine terminal speed when the amount of shaft twist exceeds the threshold twist value in step (ii).

14. A method of detecting a shaft break in a turbine engine, the shaft connecting a torque-exerting turbine of the turbine engine to a torque-receiving unit of the turbine engine, the method including:
   receiving repeated measurements of the rotational frequency of the torque-receiving unit and the rotational frequency measurements of the torque-exerting turbine;
   determining, with a processor, an acceleration of the torque-exerting turbine from the received measurements;
   detecting, with the processor, periods when the acceleration of the torque-exerting turbine falls below a threshold acceleration value;
   except for a predetermined duration following an end of each of the detected periods, when the acceleration of the torque-exerting turbine falls below the threshold acceleration value, performing the following steps (i) to (iii) with the processor:
      (i) determining from the measurements an amount of shaft twist between the torque-everting turbine and the torque-receiving unit;
      (ii) comparing the amount of shaft twist with a threshold twist value; and
      (iii) signalling the shaft break when the amount of shaft twist exceeds the threshold twist value; and
   inhibiting, with the processor, the performance of the steps (i) to (iii) for the predetermined duration following the end of each of the detected periods.

15. The method according to claim 14, wherein the threshold acceleration value is equal to the simultaneous acceleration of the torque-receiving unit as determined from the measurements optionally minus an acceleration offset value.

16. The method according to claim 14, wherein the predetermined duration is about half of the first order torsional resonance period of the engine spool formed by the torque-receiving unit, shaft and turbine.

17. The method according to claim 14, wherein the turbine engine is a gas turbine engine.

18. The method according to claim 14, further including performing the repeated measurements of the rotational frequency of the torque-receiving unit and the rotational frequency of the torque-exerting turbine.

19. A system for detecting the shaft break in the turbine engine, the shaft connecting the torque-exerting turbine of the engine to the torque-receiving unit of the engine, the system having the processor for performing the method of claim 14.

20. The system according to claim 19, further having sensors for performing the repeated measurements of the rotational frequency of the torque-receiving unit and the rotational frequency of the torque-exerting turbine.

21. The turbine engine fitted with the system of claim 19.

22. The method according to claim 14, further comprising taking accommodation actions, with the processor, to reduce the turbine terminal speed when the amount of shaft twist exceeds the threshold twist value in step (ii).

* * * * *